No. 801,258. PATENTED OCT. 10, 1905.
S. E. & W. W. MORRAL.
MACHINE FOR CUTTING OFF THE BUTT ENDS OF EARS OF CORN.
APPLICATION FILED FEB. 23, 1905.
3 SHEETS—SHEET 1.
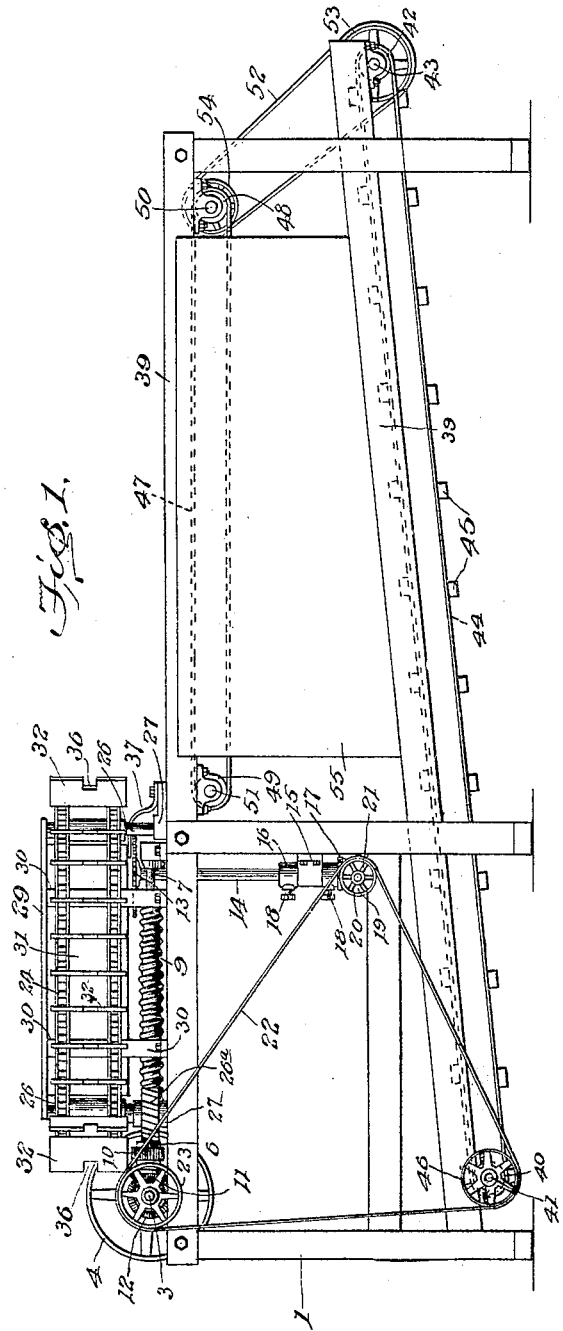
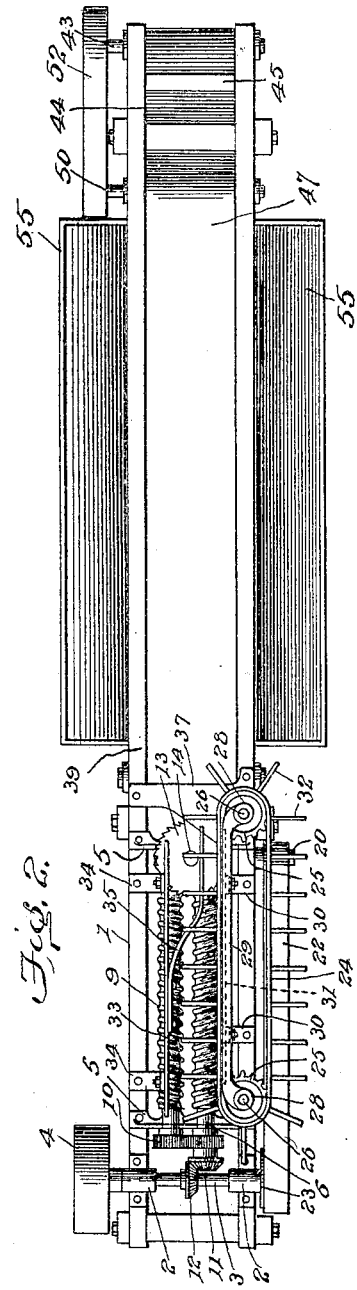
Witnesses
G. Howard Walmsley.
Irvine Miller.
Inventors
Samuel E. Morral,
and William W. Morral,
By H. A. Toulmin,
Attorney

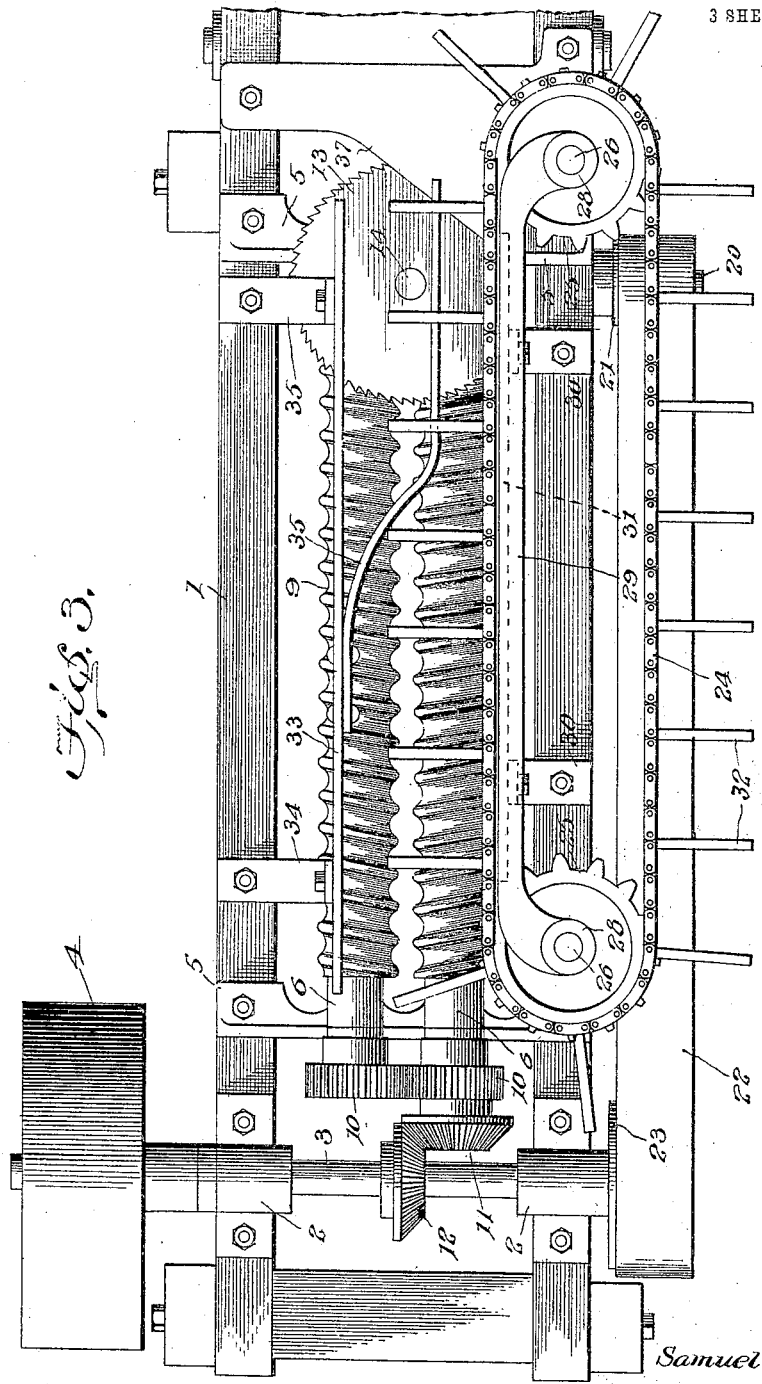

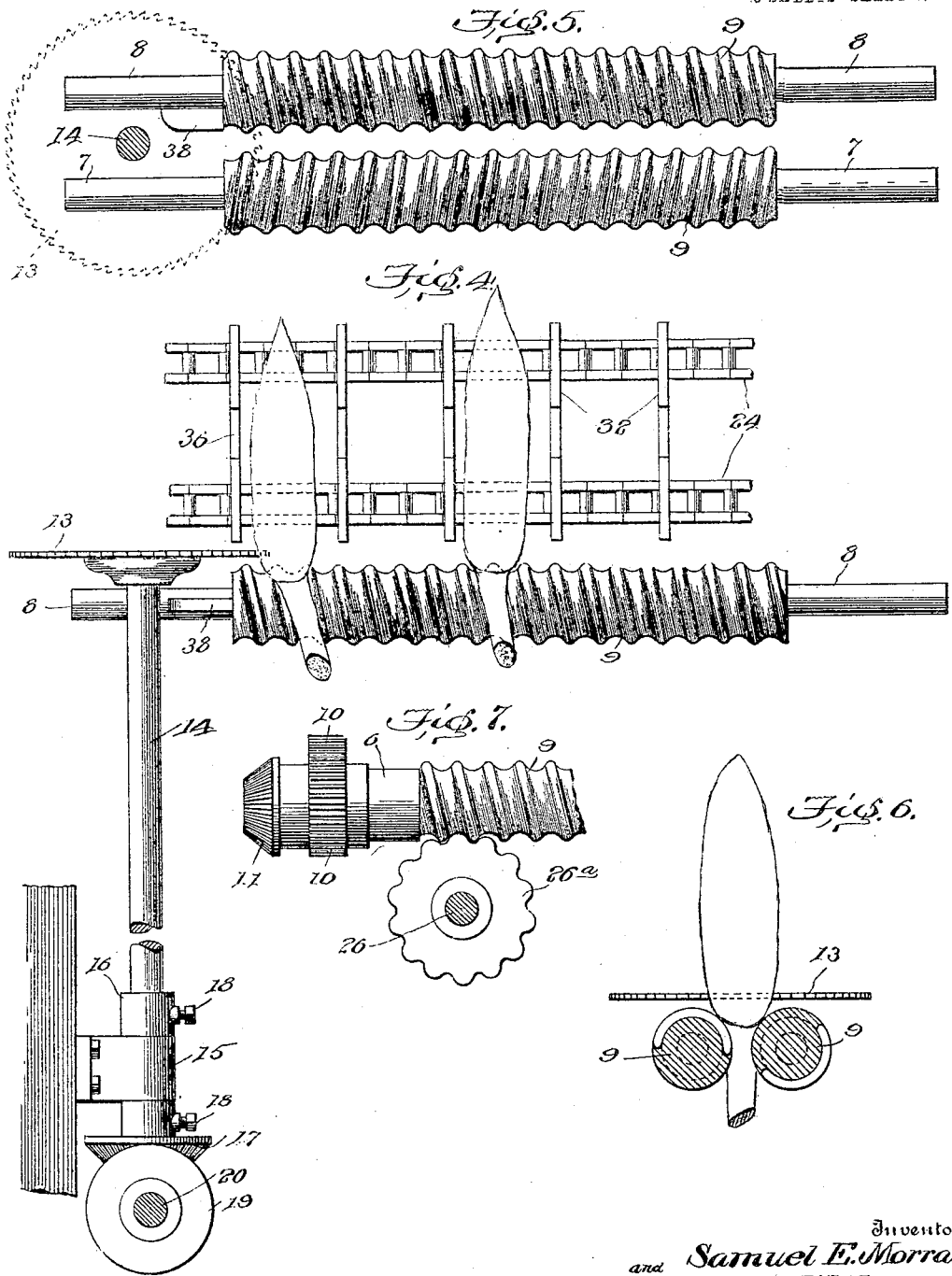

UNITED STATES PATENT OFFICE.

SAMUEL E. MORRAL AND WILLIAM W. MORRAL, OF MORRAL, OHIO.

MACHINE FOR CUTTING OFF THE BUTT-ENDS OF EARS OF CORN.

No. 801,258. Specification of Letters Patent. Patented Oct. 10, 1905.

Application filed February 23, 1905. Serial No. 246,822.

*To all whom it may concern:*

Be it known that we, SAMUEL E. MORRAL and WILLIAM W. MORRAL, citizens of the United States, residing at Morral, in the county of Marion and State of Ohio, have invented certain new and useful Improvements in Machines for Cutting Off the Butt-Ends of Ears of Corn, of which the following is a specification, reference being had therein to the accompanying drawings.

This invention relates to machines for cutting off the butt-ends of ears of corn, being primarily intended to operate upon green corn, such as is handled in canning establishments, where the corn is preserved by being packed in cans or other vessels. As a preliminary to the removal of the grains of corn from the ear it is necessary to first remove the husk, and our improvements relate to a machine which handles the ears of green corn as they come to the factory or canning establishment inclosed in their husks and with a portion of the stalk connected therewith and forming a stem. The machine is designed to cut through the ear at or near the butt-end thereof, so as to sever the same in such a way as to remove the butt-end of the ear, the stalk portion connected therewith, and that portion of the ear where the husk unites with the stalk and ear, thereby leaving the body of the ear in a condition such that it may be readily husked.

It is the object of our present invention to provide a machine whereby the severing of the butt-ends of the ears may be rapidly performed in an automatic manner, the line of cut being always at a predetermined distance from the end of the ear and the ears being fed to the cutting mechanism and presented thereto in a correct position by positively-operating mechanical means of a character such as to avoid injury to the corn.

Our invention has for a further object to provide a machine so constructed as to facilitate the operation of husking the ears after the butts have been cut therefrom and to deliver husks, butts, and stems at a suitable point of discharge. To these and other ends our invention consists in certain novel features, which we will now proceed to describe and will then particularly point out in the claims.

In the accompanying drawings, Figure 1 is a side elevation of a machine embodying our invention in one form. Fig. 2 is a top plan view of the same. Fig. 3 is a view of the left-hand portion of Fig. 2, enlarged. Fig. 4 is an enlarged detail elevation, partly broken away, showing the cutter feeding mechanism detached. Fig. 5 is a plan view of the feed-screws and cutter detached, the cutter being shown in dotted lines. Fig. 6 is a detail transverse sectional view through the feed-screws looking toward the cutter and illustrating the manner in which the feed-screws engage the ear, and Fig. 7 is a detail plan view showing the engagement with one of the feed-screws of the worm-wheel which drives the body-supporting conveyer.

In the said drawings, which show one embodiment of our invention, 1 indicates the main frame, which may be of any approved construction to support the various mechanisms. On this frame there is mounted in suitable bearings 2 the main shaft 3, provided with a pulley 4, by means of which it may be driven from any suitable source of power. The main frame is provided with transverse members 5, having bearings 6 in which are mounted two parallel shafts 7 and 8, extending longitudinally of the frame. Each shaft has formed or secured thereon a feed-screw 9, having a spiral groove, preferably curved or U-shaped in cross-section, as shown, the spirals being oppositely arranged. These shafts and their screws are driven in opposite directions in any suitable manner, the construction preferred being that shown, in which each shaft is provided with a gear 10, the two gears meshing with each other and one of the shafts—for instance, the shaft 7—being provided with a bevel-gear 11, which meshes with a bevel-gear 12 on the main shaft 3. The proportions and arrangement of the gearing are such that the adjacent sides of the screws move downward at a uniform speed, while the distance separating the feed-screws and the size of the spiral grooves therein are such as to receive the stem of the ear within the space formed by the adjacent portions of the grooves of the two screws without permitting the body of the ear to pass downward between the screws. The position of the ears relatively to the screws is shown more particularly in Figs. 4 and 6. The direction of rotation of the screws is such that the ear, with its stem thus engaged between said screws, will move from the left of the machine, as shown in Figs. 1, 2, and 3, toward the right thereof, being thus carried forward in an upright position to the cutter. This latter may be of any approved form; but we prefer to employ a saw 13, rotating in a horizontal plane immediately above the plane of the tops of the screws 9, over the delivery ends of which said saw extends slightly, as shown more particularly in Figs. 4 and 5. The saw 13 is mounted on a vertical shaft 14, which latter is mounted in suitable bearings 15, supported by the frame 1. The saw is made vertically adjustable relatively to the feed-screws 9, so as to regulate the plane of its cut and to permit it to be adjusted so as to cut more or less from the butt-end of the ear, as may be desired. This adjustment may be effected in any suitable manner, the construction which we prefer being that shown, in which the shaft 14 is vertically movable in the bearings 15, being held in position by a set-collar 16 above the upper bearing 15 and by a bevel-gear 17 below the lower bearing 15. Both bevel-gear and set-collar are secured to the shaft by set-screws 18, so that the shaft may be adjusted vertically with respect to the bearings, set-collar, and bevel-gear, and when said collar and gear are secured in position by their set-screws their engagement with the bearing 15 will prevent longitudinal movement of the shaft. The driving of the cutter-shaft and cutter is effected through the bevel-gear 17, which meshes with a similar gear 19 on a transverse shaft 20, mounted in suitable bearings on the frame 1 and provided at one end with a pulley 21. A belt 22 passes around the pulley 21 and also around a pulley 23 on the end of the main shaft 3, thereby transmitting motion from the main shaft to the shaft 20 and thence to the cutter-shaft and cutter. We also make provision for supporting the upright body of the ear while it is fed forward by the feed-screw, aiding the action of the feed-screws in carrying the ears toward the cutter and supporting the ear firmly during the cutting operation and continuing its forward feed after the butt has been severed and the feed-screws no longer affect its movements, at the same time preventing the saw from disturbing the travel of the ear after the butt has been severed. The mechanism for accomplishing this result comprises a conveyer consisting of one or more endless chains 24, preferably two in number, passing around sprocket-wheels 25, which are mounted on vertical shafts 26, located at one side of the feed-screws 9, and these shafts have their lower ends mounted in bearings 27 on the frame 1, while their upper ends are mounted in bearings 28 on the ends of a casting 29, which is supported from the main frame by uprights 30. This casting is also provided with a vertical plate 31, lying immediately adjacent to the path of that side of the conveyer which is nearest to the feed-screws and which is the working side of said conveyer, said plate forming a backing or abutment to support the conveyer in position against lateral thrust as it travels along above the feed-screws. Motion is imparted to this conveyer by means of a worm-wheel $26^a$, secured on the lower end of one of the shafts 26 and meshing with the adjacent feed-screw 9, as shown in detail in Fig. 7 of the drawings. This conveyer further comprises supporting-plates 32, secured to the sprocket-chains at intervals and extending outward therefrom, so as to project over the feed-screws when in working position. The interval between these supporting-plates is sufficient for the insertion between each two adjacent plates of an ear of corn, and said plates extend over the feed-screws sufficiently to embrace between them an ear of corn which is engaged with the feed-screws in the manner hereinbefore described. As already stated, this conveyer is arranged at one side of the feed-screws, and on the other side thereof there is arranged above the feed-screws a fixed abutment 33, extending longitudinally of the screws and parallel with the supporting-conveyer, being held in position by supporting-arms 34 from the frame 1. This abutment prevents the ears from toppling off sidewise in one direction, while the supporting-conveyer, with its supporting-plates, supports the ear on its remaining sides. A spring 35 is attached at one of its ends to the abutment 33, and the free portion of said spring extends first diagonally across the path of the ear toward the supporting-conveyer and then parallel with the supporting-conveyer above the upper face of the saw or cutter 13. The supporting-plates 32 are notched or cut away, as indicated at 36, to receive the free end of the spring 35 when the said spring is permitted by the absence of the ears of corn to move into the position shown in the drawings.

37 indicates a guard which extends over the cutter or saw 13 on that side thereof farthest from the point of cut and below the path of the severed ear, said guard being downwardly inclined beyond said saw at the point of discharge of the ear from the supporting-conveyer to receive the ear and guide it in its discharge from said conveyer.

The mechanism just described, which constitutes the machine proper considered as a cutter, operates in the following manner: The ears of corn are placed one at a time stem downward between the guiding-plates 32 at that end of the feed-screws farthest from the cutter. As the stem of each ear is engaged between the feed-screws the ear is carried forward toward the cutter by said screws supported in an upright position between the supporting-plates at the front and rear, the fixed abutment 33 on one side and the conveyer-chains 24 and abutment 31 on the other side. As the ear approaches the cutter it is held firmly against the supporting-conveyer and its abutment by the spring 35 and is firmly held by the surrounding parts during the actual severing of the butt-end thereof. When the butt is severed, both the saw and spring 35 tend to hold the body of the ear against the supporting-conveyer, which latter, aided by the saw, continues to feed the body of the ear forward in the proper direction. After the ear passes a line extending transversely through the axis of the saw the action of the saw would tend to throw the ear out laterally if it were not for the guard 37, which is now interposed between the lower end of the ear and the saw and prevents such action of the saw. The severed ear is finally discharged by gravity down the inclined guard 37 after passing clear of the saw and spring 35 at the point where the supporting-conveyer passes around the supporting sprocket-wheels and starts upon its return journey. The severed butts pass downward between the shafts 7 and 8 at the point where the screws 9 terminate, as shown in Figs. 4 and 5, and to insure the proper and positive discharge of these severed butts one of the shafts is provided with a lug or projection 38, located at the end of the feed-screws, which projection as the shaft rotates positively engages the butt and forces it down between the shafts in case there is any tendency for the butts to stick or accumulate at that point.

The machine shown in Figs. 1 and 2 of the drawings is further organized for the handling of the severed butts and ears, and to this end the main frame 1 is provided with an extension 39 beyond the point of discharge of the ears. A roller 40 is mounted on a shaft 41, located near the receiving end of the machine near the bottom of the frame 1, and a similar roller 42 is mounted on a shaft 43, located at the farther end of the frame extension 39. A belt conveyer 44 passes around the rollers 40 and 42, said belt being preferably provided with cleats or projections 45 to better engage the material to be conveyed. This belt may be conveniently driven by the belt 22, which passes around a pulley 46 on the end of the shaft 41. It will be noted that this belt extends under that part of the machine where the feed-screws and cutter coöperate, so that the severed butts will fall upon the conveyer-belt and be carried thence out of the machine and discharged at the farther end of the extension thereof. Said extension is provided above the belt 44 with a second conveyer-belt 47, passing around rollers 48 and 49, carried by shafts 50 and 51, respectively. The conveyer-belt 47 is actuated by a driving-belt 52, which passes around a pulley 53 on the shaft 43 and a pulley 54 on the shaft 50. It will be noted that the receiving end of the conveyer-belt 47 is located immediately below the end of the inclined guard 37, so that the severed ears when discharged upon the guard 37 will fall from said guard upon said conveyer-belt. This belt is of a length sufficient to permit one or more huskers to stand on each side thereof, and as the ears of corn are carried along by the belt between the huskers these latter can readily lift the ears from the belt and quickly husk them, since they are easily husked after the butts have been removed. The husked ears may be placed in baskets or other suitable receptacles, while the husks are thrown upon the lower conveyer-belt 44. To assist in this latter operation, a chute 55 is located on each side of the belt 47, their open mouths extending laterally along each side of the belt in a position to readily receive the husks which may be dropped therein, while their slanting walls converge, so as to terminate above the lower belt 44, upon which the husks fall and are carried off along with the butts.

The machine thus organized is simple in construction and efficient in operation, being practically automatic in its action so far as the cutting of the butt from the ear is concerned, the amount cut off at the butt-end being the same in the case of each ear and that amount being predetermined by the adjustment of the cutter. The cutting operation is rapidly performed, the ears being positively fed and held in proper position before, during, and after the cutting without danger of injury to the corn. While we have shown the machine as embodying in addition to the cutting mechanism mechanism adapting the same to the operation of husking the ears by hand, yet it is evident that there may be substituted for this latter mechanism a mechanism of an automatic character—such, for instance, as the machine set forth in our prior Letters Patent, No. 484,808, issued October 25, 1892—which machine may be so arranged as to receive the ears as they come from the cutter and remove the husks from the ears.

It is obvious that various modifications in the structure may be made without departing from the principle of our invention, and we therefore do not wish to be understood as limiting ourselves strictly to the precise details hereinbefore described, and shown in the accompanying drawings.

Having thus fully described our invention, what we claim as new, and desire to secure by Letters Patent, is—

1. In a machine for cutting off the butt-ends of ears of corn, the combination, with two oppositely-threaded feed-screws arranged to receive the stalk and prevent the passage of the ear between them, of means for rotating said screws in opposite directions, and a cutter located and operating at the discharge end of said feed-screws, substantially as described.

2. In a machine for cutting off the butt-ends of ears of corn, the combination, with two oppositely-threaded feed-screws arranged to receive the stalk and prevent the passage of the ear between them, of means for rotating said screws in opposite directions, and a cutter operating in a plane above said screws at the discharge end thereof, the screws extending beyond the line of cut, substantially as described.

3. In a machine for cutting off the butt-ends of ears of corn, the combination, with two oppositely-threaded feed-screws arranged to receive the stalk and prevent the passage of the ear between them, of means for rotating said screws in opposite directions, and a cutter located and operating at the discharge end of said screws, said parts being relatively adjustable to vary the distance between the cutter and screws and regulate the amount cut from the ear, substantially as described.

4. In a machine for cutting off the butt-ends of ears of corn, the combination, with two oppositely-threaded feed-screws arranged to receive the stalk and prevent the passage of the ear between them, of means for rotating said screws in opposite directions, and a cutter operating in a plane above said screws at the discharge end thereof, the screws extending beyond the line of cut, said parts being relatively adjustable to vary the distance between the cutter and screws and regulate the amount cut from the ear, substantially as described.

5. In a machine for cutting off the butt-ends of ears of corn, the combination, with two oppositely-threaded feed-screws arranged to receive the stalk and prevent the passage of the ear between them, of means for rotating said screws in opposite directions, and a cutter located and operating at the discharge end of said screws, said cutter being adjustable toward and from said screws to vary the height of the cut, substantially as described.

6. In a machine for cutting off the butt-ends of ears of corn, the combination, with two oppositely-threaded feed-screws arranged to receive the stalk and prevent the passage of the ear between them, of means for rotating said screws in opposite directions, and a cutter operating in a plane above said screws at the discharge end thereof, the screws extending beyond the line of cut, said cutter being adjustable toward and from said screws to vary the height of the cut, substantially as described.

7. In a machine for cutting off the butt-ends of ears of corn, the combination, with two oppositely-threaded feed-screws arranged to receive the stalk and prevent the passage of the ear between them, of means for rotating said screws in opposite directions, and a rotatory cutter operating in a plane above the discharge ends of said screws, substantially as described.

8. In a machine for cutting off the butt-ends of ears of corn, the combination, with two parallel oppositely-threaded feed-screws, arranged to receive the stalk and prevent the passage of the ear between them, and means for rotating said screws in opposite directions, of a shaft extending and adjustable transversely of the plane of said feed-screws, and a cutter mounted on said shaft and extending over the discharge end of said feed-screws, substantially as described.

9. In a machine for cutting off the butt-ends of ears of corn, the combination, with two oppositely-threaded feed-screws arranged to receive the stalk and prevent the passage of the ear between them, and means for rotating said screws in opposite directions, of a cutter operating at the discharge ends of said feed-screws, and a supporting-conveyer located above said feed-screws, moving in the direction of their feed, and provided with means for supporting the bodies of the ears which project above said feed-screws, substantially as described.

10. In a machine for cutting off the butt-ends of ears of corn, the combination, with two oppositely-threaded feed-screws arranged to receive the stalk and prevent the passage of the ear between them, and means for rotating said screws in opposite directions, of a cutter operating at the discharge ends of said feed-screws, and a supporting-conveyer located above said feed-screws, moving in the direction of their feed, and provided with means for supporting the bodies of the ears which project above said feed-screws, said supporting-conveyer extending beyond the discharge end of the feed-screws to feed forward the severed ears, substantially as described.

11. In a machine for cutting off the butt-ends of ears of corn, the combination, with two oppositely-threaded feed-screws arranged to receive the stalk and prevent the passage of the ear between them, and means for rotating said screws in opposite directions, of a cutter operating at the discharge ends of said feed-screws, a supporting-conveyer located above said feed-screws, moving in the direction of their feed, and provided with means for supporting the bodies of the ears which project above said feed-screws, said supporting-conveyer extending beyond the discharge end of the feed-screws and beyond the cutter, and a yielding abutment extending over the cutter and coöperating with said conveyer to hold the severed ears in place therein, substantially as described.

12. In a machine for cutting off the butt-ends of ears of corn, the combination, with two oppositely-threaded feed-screws, arranged to receive the stalk and prevent the passage of the ear between them, and means for rotating said screws in opposite directions, of a cutter operating at the discharge end thereof, an endless conveyer traveling parallel with the feed-screws at one side thereof and having supporting members projecting over the feed-screws, and a fixed supporting-abutment located above the feed-screws on the other side thereof, substantially as described.

13. In a machine for cutting off the butt-ends of ears of corn, the combination, with two oppositely-threaded feed-screws, arranged to receive the stalk and prevent the passage of the ear between them, and means for rotating said screws in opposite directions, of a cutter operating at the discharge end thereof, an endless conveyer traveling parallel with the feed-screws at one side thereof and having supporting members projecting over the feed-screws, and a fixed supporting-abutment located above the feed-screws on the other side thereof, said supporting-conveyer extending beyond the discharge end of the feed-screws and over the cutter, and said fixed abutment being provided with a spring extending across the path of the ears and beyond the discharge end of the feed-screws above the cutter, substantially as described.

14. In a machine for cutting off the butt-ends of ears of corn, the combination, with two oppositely-threaded feed-screws, arranged to receive the stalk and prevent the passage of the ear between them, and means for rotating said screws in opposite directions, of a cutter operating at the discharge end thereof, an endless conveyer traveling parallel with the feed-screws at one side thereof and having supporting members projecting over the feed-screws, and a spring extending across the path of the ears and beyond the feed-screws, the supporting members of the conveyer being recessed to receive the spring, substantially as described.

15. In a machine for cutting off the butt-ends of ears of corn, the combination, with two oppositely-threaded feed-screws, arranged to receive the stalk and prevent the passage of the ear between them, and means for rotating said screws in opposite directions, of a cutter operating at the discharge ends of said feed-screws, a supporting-conveyer provided with supporting members extending and traveling over said feed-screws and cutter in the direction of the feed, a yielding abutment coöperating with said supporting-conveyer to hold the severed ears therein as they travel over the cutter, and a guard extending over that portion of the cutter over which the ears are delivered, substantially as described.

16. In a machine for cutting off the butt-ends of ears of corn, the combination, with two shafts arranged side by side and provided with feed-screws arranged to receive the stalk and prevent the passage of the ear between them, and means for rotating said shafts in opposite directions, of a cutter operating above said feed-screws at the discharge ends thereof, said shafts extending beyond said discharge ends, and one of them being provided with a projection adjacent to said discharge end to force the severed butts down between the shafts, substantially as described.

17. In a machine for cutting off the butt-ends of ears of corn, the combination, with two oppositely-threaded feed-screws arranged to receive the stalk and prevent the passage of the ear between them, means for rotating said screws in opposite directions, and a cutter operating at the discharge end of said screws, of a supporting-conveyer coöperating with said feed-screws and cutter and comprising an endless traveling member provided with means for engaging and supporting the bodies of the ears above the feed-screws, upright shafts around which said endless member travels, and a worm-wheel mounted on one of said shafts and engaging one of said feed-screws so as to be operated thereby, substantially as described.

18. The combination, with two oppositely-threaded feed-screws arranged to receive the stalk and prevent the passage of the ear between them, means for rotating said screws in opposite directions, a cutter operating at the discharge end of said screws, whereby the severed butts are discharged downward at the end of the feed-screws, and a supporting-conveyer for carrying the severed ears over the cutter, of an endless conveyer-belt receiving the severed ears from said supporting-conveyer, and a second conveyer-belt located below the first-mentioned conveyer-belt and extending under the cutter to receive the butts and stalks, substantially as described.

19. The combination, with two oppositely-threaded feed-screws arranged to receive the stalk and prevent the passage of the ear between them, means for rotating said screws in opposite directions, a cutter operating at the discharge end of said screws, whereby the severed butts are discharged downward at the end of the feed-screws, and a supporting-conveyer for carrying the severed ears over the cutter, of an endless conveyer-belt receiving the severed ears from said supporting-conveyer, a second conveyer-belt located below the first-mentioned conveyer-belt and extending under the cutter to receive the butts and stalks, and chutes having their receiving-mouths located on opposite sides of the upper conveyer-belt and their discharge-mouth located above the lower conveyer-belt, substantially as described.

20. In a machine for cutting off the butt-ends of ears of corn, the combination, with a feeding, gaging and holding device comprising a feed-screw and a coöperating member located alongside thereof, the two being arranged to receive the stalk and prevent the passage of the ear between them, of means for rotating said feed-screw, and a cutter located and operating at the discharge end of said feeding device, substantially as described.

21. In a machine for cutting off the butt-ends of ears of corn, the combination, with a feeding, gaging and holding device comprising a feed-screw and a coöperating rotatory member located alongside thereof, the two being arranged to receive the stalk and prevent the passage of the ear between them, of means for rotating said feed-screw, and a cutter located and operating at the discharge end of said feeding device, substantially as described.

22. An ear-feeding device for machines for removing the butt-ends of ears of corn, comprising a screw conveyer adapted to engage the ears of corn and feed them along, and a supporting-conveyer of the endless type cooperating with said screw conveyer and constructed and arranged to hold the ears at right angles to the screw conveyer, substantially as described.

23. An ear-feeding device for machines for removing the butt-ends of ears of corn, comprising a screw conveyer adapted to engage the ears, feed them along, and gage their position, and an endless supporting-conveyer located adjacent to the screw conveyer and provided with means for supporting the bodies of the ears, substantially as described.

In testimony whereof we affix our signatures in presence of two witnesses.

SAMUEL E. MORRAL.
WILLIAM W. MORRAL.

Witnesses:
C. J. SCHULTZ,
H. A. DE ROCHE.